Patented Mar. 11, 1930

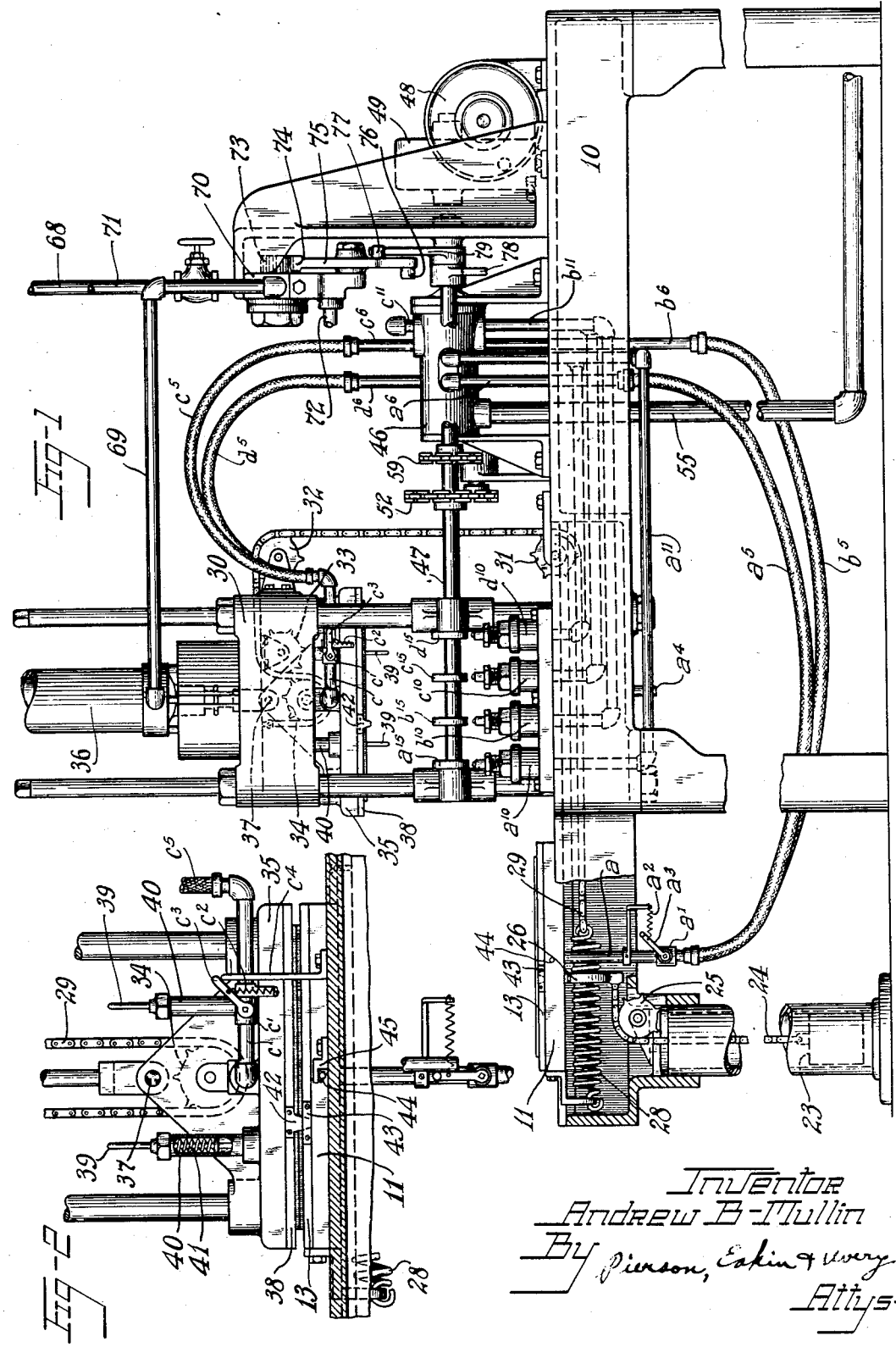

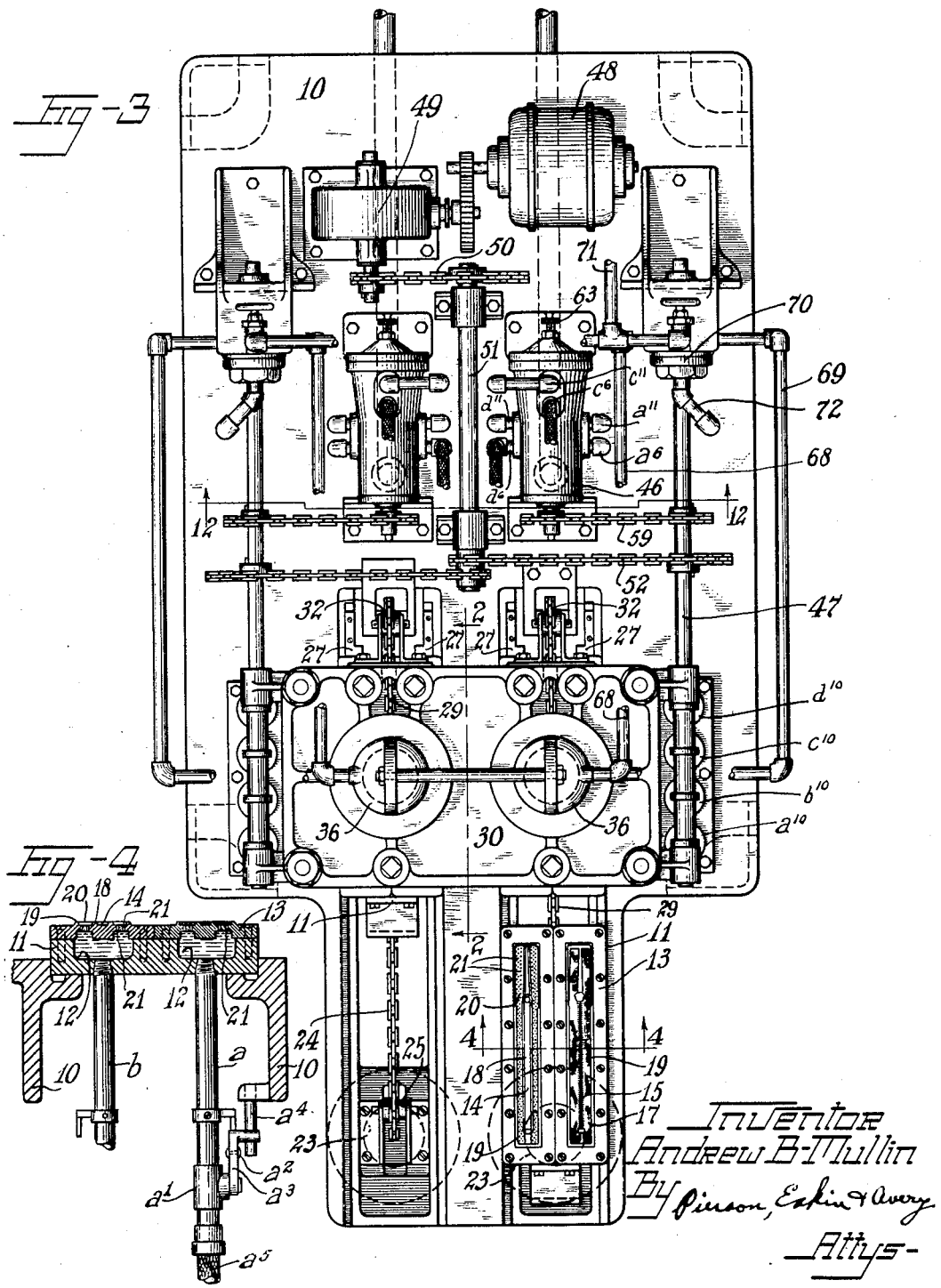

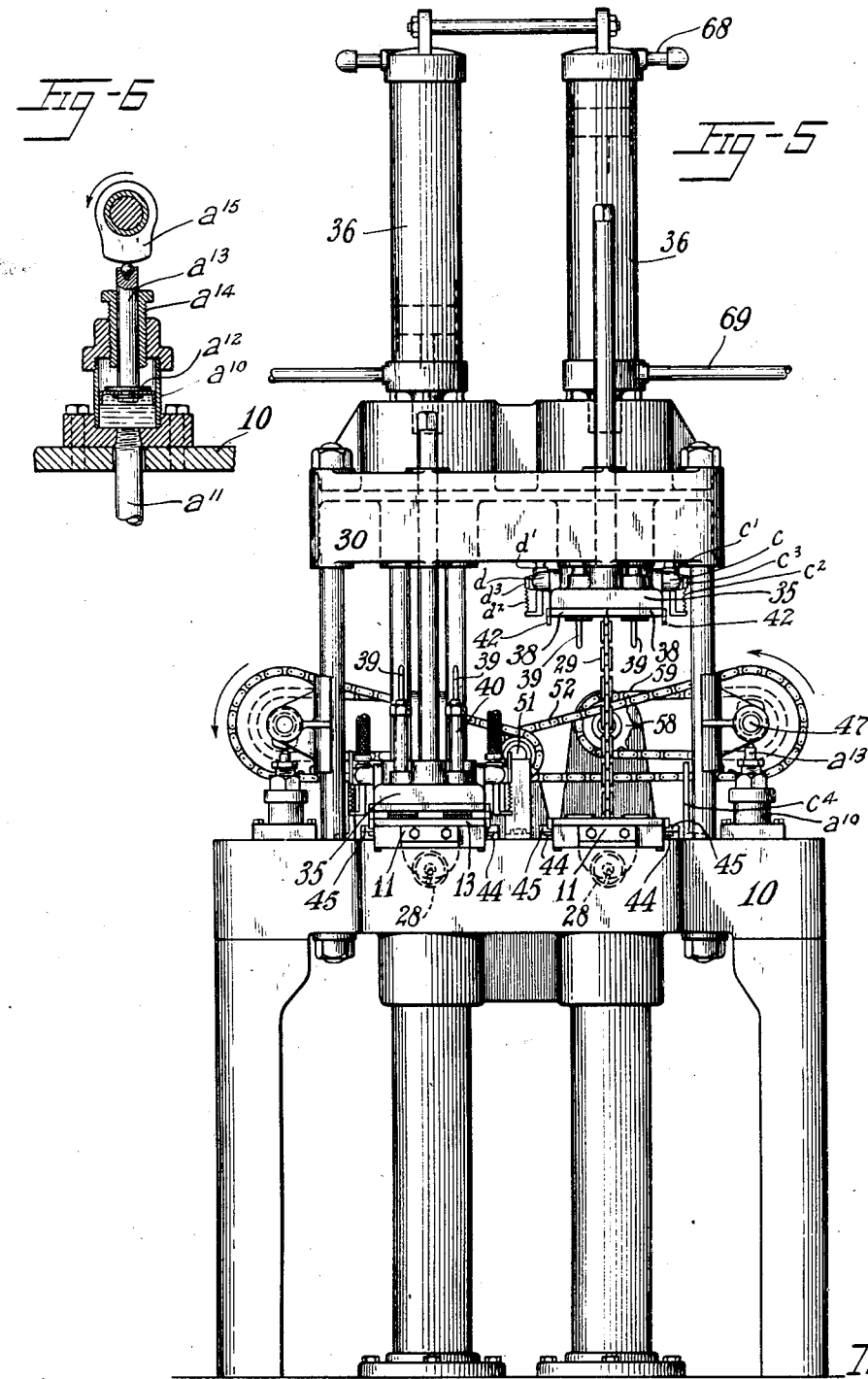

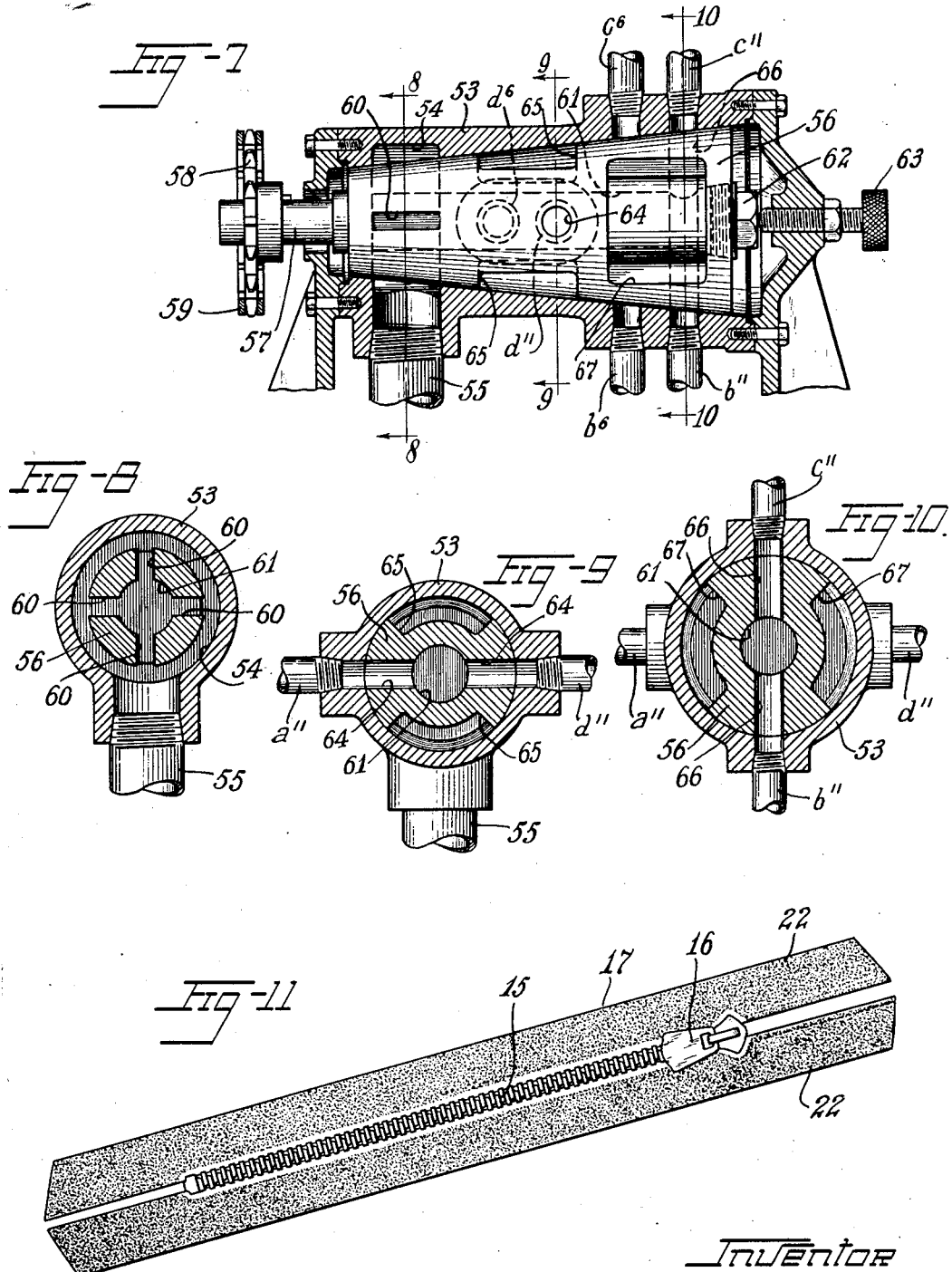

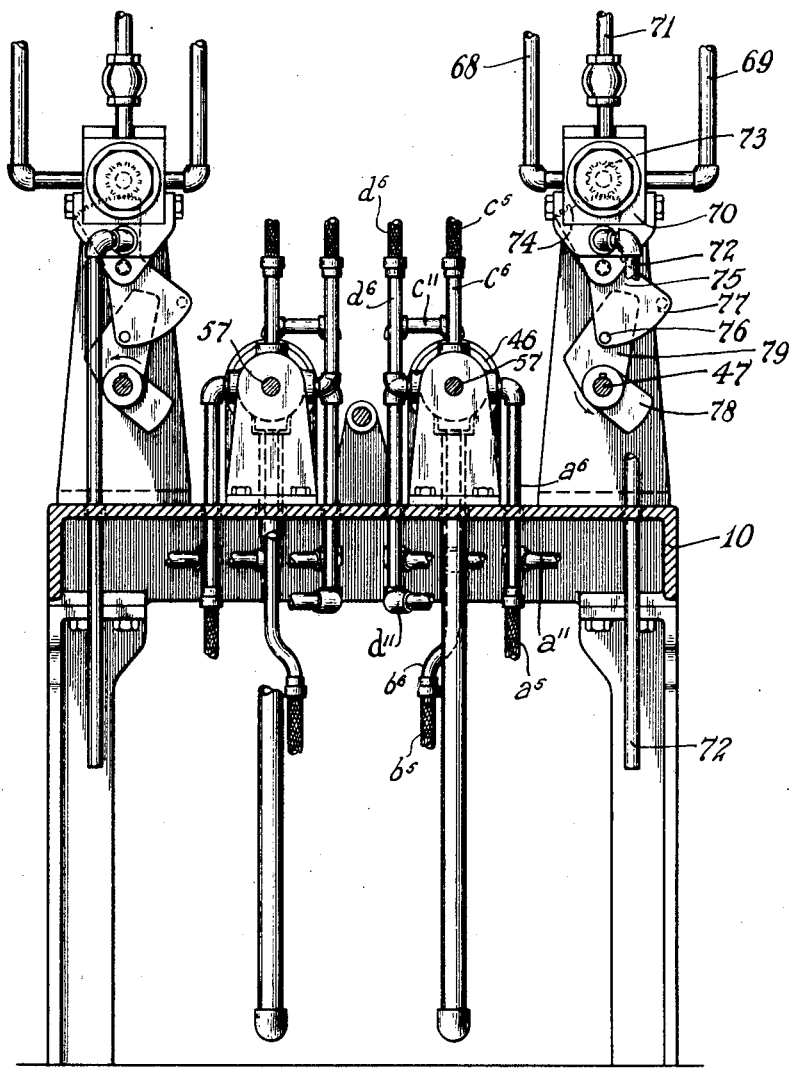

1,749,921

UNITED STATES PATENT OFFICE

ANDREW B. MULLIN, OF KENMORE, OHIO, ASSIGNOR TO THE B. F. GOODRICH COMPANY, OF NEW YORK, N. Y., A CORPORATION OF NEW YORK

APPARATUS FOR COATING DEFINED AREAS OF FABRIC ELEMENTS

Application filed March 24, 1927. Serial No. 177,972.

This invention relates to apparatus for applying a coating of fluid or viscous material such as rubber cement to defined areas of fabric elements such as the stringer tapes of slide fasteners, to be incorporated in overshoes, for example, which require a coating of cement on each face throughout the region of the tape which is to be built into the wall structure of the overshoe but to be left free of cement in the region of the metal parts such as the jaw elements and the jaw-actuating slide.

My general objects are to economize in labor and materials in performing work of this character and to provide a neat application of the cement throughout clearly defined areas without undesirable smearing of the cement upon other parts of the work. More specific objects are to apply measured quantities of cement to the respective pieces of work, to provide a machine largely automatic in operation, to avoid disagreeable contamination of the hands of the operator, and to apply cement coatings simultaneously to both sides of the work. More detailed objects will be manifest.

Referring to the drawings:

Fig. 1 is a side elevation, with parts sectioned and broken away, of a slide-fastener cementing machine embodying my invention in its preferred form.

Fig. 2 is a vertical longitudinal section of a portion of the machine on line 2—2 of Fig. 3, parts being shown in elevation and a part being sectioned and broken away.

Fig. 3 is a plan view of the machine with parts broken away.

Fig. 4 is a section on line 4—4 of Fig. 3.

Fig. 5 is a front elevation of the machine, parts being broken away.

Fig. 6 is a vertical section of a cement-measuring cylinder and adjacent parts.

Fig. 7 is a vertical longitudinal section of a valve device.

Fig. 8 is a section on line 8—8 of Fig. 7.

Fig. 9 is a section on line 9—9 of Fig. 7.

Fig. 10 is a section on line 10—10 of Fig. 7.

Fig. 11 is a plan view of the finished work.

Fig. 12 is a section on line 12—12 of Fig. 3.

The machine comprises a frame 10 upon which is mounted in suitable guide-ways a pair of slides 11, 11 each formed with two internal cement chambers 12, 12 (Fig. 4) of which the cover member of each consists of a die-plate 13 fastened upon the slide by screws and formed on its upper face with a recess 14 shaped to accommodate the row 15 of metal jaw members and the slide assembly 16 of a slide fastener 17 (Fig. 11). The said recess 14 is defined by a flange 18 which, with a spaced-apart surrounding flange 19, defines a cement-receiving recess 20 having the form of the area of the slide-fastener tapes to which it is desired to apply cement. The recess 20 communicates through numerous small apertures 21, 21 with the respective cement cavity 12 of the slide, to receive cement therefrom. The flanges 18 are adapted to bear against the fabric stringer tapes 22, 22 of the slide fastener and the flanges 19 are adapted to bear against similar flanges on coacting die-plates to limit the application of cement to the desired areas.

Each of the slides 11 is constantly urged in its guide-ways toward the front of the machine by a weight 23 connected, by a sprocket chain 24 running over an idler sprocket 25, with a bracket 26 secured to the under side of the slide, and for moving the slide in the opposite direction to cementing position, against stops 27, 27 (Fig. 3) mounted in its guide-way, the slide is connected by a pull spring 28 (Fig. 1) and a sprocket chain 29 with the stationary arch 30 of a press structure mounted upon the frame 10, the sprocket chain 29 passing about idler guide sprockets 31, 32, 33 journaled at fixed positions and about an idler sprocket 34 journaled upon a movable upper press member 35, in such relation that downward movement of the press head 35 will move the slide 11 to the right as viewed in Fig. 1, to its cementing position against the stops 27, further downward movement of the head 35 then being permitted by elongation of the pull spring 28.

One of the upper members 35 is provided for each of the slides 11 and adapted to coact therewith in pressing the work, and their actuating mechanism is so constructed that one of the press members 35 is down in pressing position when the other is elevated, and vice versa.

Their actuating mechanisms include respective fluid-pressure cylinders 36, 36 mounted upon the top of the arch member and having their piston rods secured to the respective press members 35 as at 37, Fig. 1.

Secured to the lower face of each press member 35 are two die-plates 38, 38 (Figs. 2 and 5) formed with recesses and flanges respectively registering with those of the lower die-plates 13, said plates being formed with perforations corresponding to the perforations 21 of the lower die-plates and the plates constituting the floors of respective cement chambers formed in the press member 35 and corresponding to the cement chambers 12 of the slide 11.

Mounted upon the press member 35 over each of the die-plates 38 are two spaced-apart plunger pins 39, 39 mounted in suitable housings 40, 40 and urged downward by respective springs such as the spring 41 (Fig. 2), the lower end portions of the plunger pins slidably extending through suitable apertures in the respective die-plates 38 and being pointed at their lower ends, the construction being such that in the descent of the press member 35 the points of the plunger pins engage the jaw members 15 of the slide fastener 17 before the press member is in its lowermost position and thus hold the slide fastener in place as the press member further descends and thereby compresses the compression springs 41, the pins then continuing to hold the work in place upon the lower die in the first part of the subsequent upward movement of the upper press member, to separate the work from the upper die and leave it lying on the lower die.

Mounted on each side face of the press member 35 is a dowel 42 adapted to coact with a socket member 43 (Fig. 2) secured upon the slide 11, to assure exact registry of the upper and lower die-plates when they are in pressing relation.

Projecting from each side face of the slide 11 is a pin 44 adapted to interlock under a bracket 45 secured to the frame of the machine, to prevent lifting of the slide when the upper press member 35 and its die-plates 38 are lifted from the work.

Each of the two units of the machine, each comprising a lower pair of die-plates 13 mounted upon their slide 11 and an upper pair of die-plates 38 mounted upon their press member 35, is provided with a set of cement-measuring and forcing devices. As each set is substantially a duplicate of that provided for the other unit of the machine, it will be necessary to describe only one of them, and those furnishing cement to the die-plates of the right hand unit as viewed in Figs. 3 and 5 will be taken for purpose of description.

Entering the cement chambers 12 from below (see Fig. 4) are respective supply pipes $a, b$ provided with respective stop valves such as the valve $a^1$ (Figs. 1 and 4) urged toward closed position by a pull spring such as the spring $a^2$ and adapted to be automatically opened as the slide reaches cementing position by contact of its valve lever $a^3$ with a stop pin $a^4$ projecting downward from the frame of the machine. The said pipes $a$ and $b$, below the said stop valves, connect with respective flexible pipes $a^5$ and $b^5$ running from respective pipes $a^6$, $b^6$ projecting downward from a side part and the bottom respectively of a valve device 46.

Similarly the cement chambers of the upper press member 35 have leading into them respective supply pipes $c, d$ (Figs. 1 and 5) provided with respective stop valves $c^1$, $d^1$ urged toward closed position by respective pull springs $c^2$, $d^2$ and adapted to be automatically opened as the press members 35 reaches cementing position by contact of their valve levers $c^3$, $d^3$ with respective stop pins such as the pin $c^4$ (see Figs. 2 and 5). On the receiving side of their valves $c^1$, $d^1$ the said pipes $c$ and $d$ connect with respective flexible pipes $c^5$, $d^5$ running from respective pipes $c^6$, $d^6$ projecting upward from the top and from a side part respectively of the valve device 46.

For measuring successive charges of cement forced through the respective pipe lines, $a, b, c, d$ after each opening of the respective valves $a^1$, $b^1$, $c^1$, $d^1$, a set of measuring cylinders $a^{10}$, $b^{10}$, $c^{10}$, $d^{10}$ connected by respective pipes $a^{11}$, $b^{11}$, $c^{11}$, $d^{11}$ with the valve device 46, each of the said pipes entering the casing of the valve device 46 at a position close to the pipe designated by the same letter with the exponent "6" and being adapted to be put into communication with such pipe by the valve device 46, for flow of cement from the measuring cylinder to the respective terminal pipes $a, b, c, d$.

The measuring cylinders and parts contained therein are of like construction, and consequently will be described with reference only to the cylinder $a^{10}$, shown in section in Fig. 6. The cylinder's piston $a^{12}$ is provided with a stem $a^{13}$ slidably mounted in an adjustable, threaded bushing $a^{14}$ screwed through the upper head of the cylinder and adapted to be abutted at its lower end by the piston $a^{12}$ to limit the rise of the latter under the force of cement forced into the cylinder from the pipe $a^{11}$, and thus to determine the amount of cement to be forced into the respective cement chambers 12 through the pipe $a$ in each cycle of operation, the threaded bushing $a^{14}$ being adapted to be screwed downward or upward in the cylinder head for adjustment to control the quantity of the charge of cement.

The several cement-measuring pistons such as the piston $a^{12}$ (Fig. 6) are adapted to be forced simultaneously downward in their cylinders in each cycle of operation by respective cams $a^{15}$, $b^{15}$, $c^{15}$, $d^{15}$ secured upon a shaft 47, the shaft 47 having driving connection from a motor 48 through a reduction gear 49, a sprocket chain 50, a shaft 51, and a sprocket chain 52 (Fig. 3).

The valve device 46 comprises a casing 53 (Figs. 7 to 10) having a tapered bore, in the small end of which the casing is formed with an annular groove 54 which is of larger diameter than the small end of the tapered bore and is in communication with a cement supply pipe 55 leading from any suitable source of cement under pressure.

Mounted in the casing 53 is a tapered valve-plug 56 formed with a stem 57 projecting axially from the small end of the plug through an aperture in the end bracket of the casing and having secured thereon a sprocket 58 connected by a sprocket chain 59 with a sprocket secured upon the shaft 47, for constant rotation of the valve-plug 56 counter-clockwise as viewed in Figs. 8 to 10.

Within the limits of the annular groove 54 of the valve casing the valve-plug 56 is formed with four radial passages 60, 60 (Figs. 7 and 8) connecting the groove 54 with an axial bore 61 formed in the valve-plug and closed at the small end thereof by an integral wall of the valve-plug and closed at the large end of the valve-plug by a screw-plug 62 (Fig. 7). The screw-plug 62 is centrally contacted by the inner end of a set screw 63 adapted to adjust the valve-plug toward the small end of the bore of the casing 53 to compensate for wear of the plug and casing.

At its middle, in the region of the mouths of the pipes $a^6$, $a^{11}$ and $d^6$, $d^{11}$ the plug is formed with radial passages 64, 64 adapted, twice during each revolution of the valve-plug, to put the central bore 61 of the latter in communication momentarily with the pipes $a^{11}$ and $d^{11}$ leading respectively to the measuring cylinders $a^{10}$ and $d^{10}$.

At the same position axially the valve-plug is formed with arcuate recesses 65, 65 in its periphery, circumferentially spaced from the passages 64, and adapted, twice during each revolution of the plug, to maintain the pipe $a^{11}$ in communication with the pipe $a^6$, while they are closed off from the bore 61 of the plug, and to maintain the pipe $d^{11}$ in communication with the pipe $d^6$ for a time while they are shut off from the bore 61 of the plug. Thus the construction is such that as the valve-plug revolves cement will first flow through the pipes $a^{11}$ and $d^{11}$ to the measuring cylinders $a^{10}$ and $d^{10}$, charging the latter with cement by lifting their pistons, such as the piston $a^{12}$ (Fig. 6), while their respective cams $a^{15}$, $d^{15}$ are in the inoperative part of their orbit, and then, the supply of cement to the pipes $a^{11}$, $d^{11}$ being shut off and they being in communication, through the recesses 65, with the pipes $a^6$ and $d^6$ respectively, the further rotation of the cams $a^{15}$, $d^{15}$ will force down the pistons of the cylinders $a^{10}$ and $d^{10}$ and thus force measured quantities of cement through the terminal pipes $a$ and $d$ into their respective cement chambers and through the respective die-plates, further rotation of the valve-plug 56 then closing off the entrances of the pipes $a^6$ and $d^6$ while the measuring cylinders $a^{10}$ and $d^{10}$ are again charged with cement through the pipes $a^{11}$ and $d^{11}$.

Referring to Figs. 7, 9 and 10 it will be seen that at the times when the passages 64 of the valve-plug are in communication with the pipes $a^{11}$ and $d^{11}$ similar radial passages 66, 66 formed in the plug nearer its larger end are in communication with the pipes $b^{11}$, $c^{11}$ for charging the measuring cylinders $b$ and $c$ with cement, and that at the same time that the pipe $a^6$ is put in communication with the pipe $a^{11}$ and the pipe $d^6$ is put in communication with the pipe $d^{11}$ for the forcing of the cement from the measuring cylinders to the dies, the pipe $c^6$ is put in communication with the pipe $c^{11}$ and the pipe $b^6$ is put in communication with the pipe $b^{11}$, for the same purpose with respect to the other two dies, by arcuate slots 67, 67 (Figs. 7 and 10) formed in the valve-plug 56.

For automatically actuating the fluid-pressure cylinder 36 to raise and lower the upper press member 35 at determinate time intervals, the cylinder is provided with an upper pipe 68 and a lower pipe 69 running from a four-way valve 70 having a supply pipe 71 and an exhaust pipe 72. The valve stem has secured thereon a pinion 73 meshed with a gear segment 74 formed on the upper end of a two-armed lever 75, the lower arm of which is broadened at its end and has a stud 76 projecting from its front face at one corner thereof (Fig. 12) and a stud 77 projecting from its rear face at the other corner thereof. Secured upon the shaft 47 is an arm 78 adapted to strike the stud 76 to throw the lower end of the lever 75 to the left as viewed in Fig. 12, and secured upon the shaft 47 at the rear of the arm 78 is a cam 79 adapted, when the lever has thus been positioned by the arm 78, to coact with the stud 77 in a crowding action to return the lever 75 to its original position with its lower end to the right as viewed in Fig. 12. Thus the upper press member 35 is lowered and raised during each revolution of the shaft 47.

In the first part of each cycle of operation of the machine, the machine permissibly being continuously driven, the measuring cylinders $a^{10}$ to $d^{10}$ are charged with cement, the slide 11 is drawn to cementing position, with the work thereon, which automatically opens the valves $a^1$, $b^1$; the upper press member 35 is brought down against the work; and the cement is forced through the four die-plates simultaneously into contact with the work in measured quantities equal to the adjusted capacities of the respective measuring cylinders. Then the upper press member 35 is lifted and the slide 11 is drawn back to an exposed position at the front of the machine by the weight 23, the valve $a^1$ and $b^1$ being automatically closed in such movement of the slide by the springs $a^2$, $b^2$, shutting off such flow of cement to the dies as might result from elasticity of the pipes $a^5$, $b^5$, while the measuring cylinders are again being charged with cement. Similarly the flow of cement to the upper dies is shut off by the closing of the valves $c^1$, $d^1$ by the springs $c^2$, $d^2$, in the upward movement of the press member 35.

The slide fasteners are mounted upon and removed from the lower die-plates 13 while the slide 11 is in its exposed position at the front of the machine. When the slide is drawn to cementing position by the downward movement of the press member 35 and stopped therein by the members 27, further downward movement of the press member, permitted by the spring 28, causes the pins 39 to engage the strip of metal jaw-members 15 of the fastener and anchor the latter in place under the force of the yielding springs 41 by which the pins are backed, after which the upper die-members further descend and press against the work, their pressure being sustained by the defining flanges 18, 19 of the lower die-plates and the corresponding flanges of the upper die-plates, the inner flanges clamping the work between them and the outer flanges bearing against each other, so that the areas to be cemented, lying between the flanges, are without substantial pressure, in order that they may receive throughout their extent the cement forced through the die-plates.

In the further rotation of the machine the press member 35 is lifted, the slide 11 returned to its exposed forward position, the cemented work is removed therefrom, fasteners to be cemented are substituted, and the operation as described is thus continued in successive cycles of operation, the drive of the machine permissibly being continuous.

In the dual machine here shown, the two units are so timed that when the dies of one of the units are in cementing position the dies of the other unit are at the other part of the cycle, so that one operator may mount and remove the work with respect to both units with economy of time.

The employment of the perforate die-plates and the holding of the work adjacent the perforated area thereof, but without pressing it tightly thereagainst, results in a uniform coating of cement throughout the perforated area of the plate, as distinguished from a spotted application of cement such as would result if the work were pressed tightly against the mouths of the perforations, or a local overloading of the work with cement such as would occur if an extensive bath of cement, without the perforated plate, were caused to well up against the work.

The upper dies prevent the cement running from the chambers when they are out of contact with the work and both the upper and lower dies restrain the cement against excessive stringing when the work is removed therefrom.

The forcing means for flowing the cement are such as to act positively to provide full charges of cement notwithstanding the viscous character of the cement, which ill adapts it to be properly handled in a simple pump, for example.

Modifications are possible within the scope of my invention as defined in the appended claims.

I claim:

1. Coating apparatus comprising a pair of members adapted to embrace a piece of sheet material between them, said members being formed with registering portions adapted to compress the work to limit the spread of coating material thereon and with adjacent surfaces adapted to permit the flow of coating material thereover along the face of the work, the said members being perforated for the passage of coating material therethrough in the regions of the said surfaces, and means for forcing a coating material through the perforations of the said members.

2. Coating apparatus comprising a pair of die members formed with channels for coating material and mounted for movement to embrace a piece of sheet material between them, means for closing them together upon the work, and means for thereafter forcing coating material through the die members onto the work, the said die members being so formed as to embrace the work tightly between them throughout a zone of substantially closed form surrounding the region to be coated.

3. Apparatus as defined in claim 2 in which one of the die members is mounted for movement to and from coating position in a direction substantially parallel with its work-engaging face and the other is mounted for movement to and from coating position in a direction substantially normal to its work-engaging face.

4. Coating apparatus comprising a die member formed for the passage of a coating material therethrough and with a raised, sealing zone substantially surrounding the passage thereof and means for forcing successive predetermined quantities of coating material therethrough.

5. Apparatus as defined in claim 4 in which the means for forcing the determinate quantities of coating material comprises an expansible chamber having fluid connection to the die member, means for closing off the said chamber from the die member and for employing superatmospheric pressure for forcing coating material into the chamber from a source of supply, and means for then opening the connection from the chamber to the die member and closing the connection from the source of supply to the chamber and reducing the size of the chamber to force coating material therefrom to the die member.

6. Coating apparatus comprising two die members mounted for movement substantially parallel with their work-engaging faces into and out of coating position, two other die members mounted for movement substantially normal to their work-engaging faces into and out of coating position, each of the first-mentioned die members being adapted to mate with one of the second-mentioned die members to embrace a piece of sheet material between them at coating position, means for actuating the two pairs of mating die members in alternation so that those of one pair are in coating position while those of the other pair are separated, and means for applying coating material to the die members.

7. Coating apparatus comprising two die members mounted for movement substantially parallel with their work-engaging faces into and out of coating position, two other die members mounted for movement substantially normal to their work-engaging faces into and out of coating position, each of the first-mentioned die members being adapted to mate with one of the second-mentioned die members to embrace a piece of sheet material between them at coating position, means for actuating the two pairs of mating die members, and means for applying coating material to the die members.

In witness whereof I have hereunto set my hand this 18th day of February, 1927.

ANDREW B. MULLIN.